Patented Mar. 20, 1923.

1,449,104

UNITED STATES PATENT OFFICE.

FRIEDRICH HAYDUCK, OF WILMERSDORF, GERMANY, ASSIGNOR TO THE FLEISCHMANN COMPANY, OF NEW YORK, N. Y., A CORPORATION OF OHIO.

PROCESS FOR THE MANUFACTURE OF COMPRESSED YEAST.

No Drawing.      Application filed October 30, 1920. Serial No. 420,831.

*To all whom it may concern:*

Be it known that I, FRIEDRICH HAYDUCK, a citizen of Germany, residing at Wilmersdorf, Germany, have invented certain new and useful Improvements in Processes for the Manufacture of Compressed Yeast (for which patent application was filed in Germany August 19, 1915, Patent No. 303,252), of which the following is a specification.

This invention relates to a process of manufacturing yeast and more particularly to the process described in my copending United States application, Serial No. 420,-829, which corresponds to German Patent No. 300,663, in which a process for the manufacture of a compressed bakers' yeast from a solution of sugar material and inorganic yeast nutrient salts is disclosed, of a character which is commercially practical and has for its object a process of propagating yeast in nutrient solutions which are devoid of potassium, sodium being present in lieu thereof.

In the manufacture of yeast it has generally been assumed that the element potassium, which is an essential component of every plant, could not be dispensed with or replaced by any other substance. I have ascertained, however, that potassium as a component of yeast can be entirely replaced by sodium.

According to the process described in my co-pending United States application, Serial No. 420,829, yeast is propagated with aeration in a dilute nutrient solution which contains sugar material and relatively large amounts of inorganic nutrient salts comprising, ammonium phosphate, ammonium sulphate, calcium sulphate, magnesium sulphate and potassium sulphate.

In practicing the process of the present invention a similar procedure and nutrient solution is employed except that the potassium salt is replaced by a similar salt of sodium. The sodium salts which it is preferable thus to employ are: sodium sulphate, mono-basic and di-basic sodium phosphate and sodium carbonate.

The ashes of compressed yeast, which has been grown for many generations in accordance with the process of this invention in nutrient solutions containing no potassium salts but only sodium salts, show, as the result of my analyses, that sodium occurs in them in those quantities which are equivalent to the customary potassium content. The analyses show that potassium itself is almost entirely absent.

The result of numerous analyses and tests made upon bakers' yeast manufactured in accordance with this process, may be generalized and set forth in figures as follows:

Pure compressed yeast grown by this process, which was free from moldy yeast, was selected for test purposes.

The nutrient solution adapted for yeast propagation by this process would have, for example, the following composition:

100 parts raw sugar, first product;
4.5 parts $(NH_4)_2SO_4$ ammonium sulphate;
1.5 parts $(NH_4)H_2PO_4$ ammonium dihydrogen-phosphate;
6.8 parts $Na_2SO_4 + 10H_2O$ (= $3g.Na_2SO_4$) sodium sulphate;
0.5 parts $MgSO_4$ magnesium sulphate;
5000 parts water.

To the above solution seven parts of chalk are added for the purpose of neutralizing the mineral acids set free by the yeast during propagation.

In individual tests, the yeast was grown in nutrient solutions containing instead of raw sugar, purified raw sugar or raffinade (refined sugar). Also, instead of sodium sulphate, equivalent quantities of other sodium salts, as mentioned above, were substituted. The first preparation contained 20 parts of pure yeast, type M, which is a well known variety of yeast, and is described in bulletins which are frequently published by the Laboratorium des Instituts für Gärungsgewerbe in Berlin. Air was blown through the nutrient solution thus prepared, in the manner customarily practiced in the aerated yeast process, for a period of about 10 to 15 hours. The temperature was maintained between the limits of 25° to 30° C.

The amount of yeast obtained on the average from seven experiments in which the yeast was propagated seven times in nutrient solutions devoid of potassium compounds was as follows: 64% of the weight of the total sugar material employed or 44% of the sugar material calculated after deducting the seed yeast which was 20% of the sugar material used. After the yeast had been propagated through five times it contained a relatively large amount of sodium and a relatively small amount of potassium, the ash thereof containing 18.2% sodium (Na), propagated through five times it contained a relatively large amount of sodium and a relatively small amount of potassium, the ash thereof containing 18.2% sodium (Na), 4.7% potassium (K) as against 28% potassium, which is the usual potassium content of the ash of normally nourished yeast.

When altering the process so as to effect the gradual addition of the nutrient solution to the fermenter and the amount of seed yeast employed increased to 25 parts, the yield of yeast can be still further increased. The amount of yield, resulting from this change, when computed on the basis of the sugar content orginally present was: 110 percent, or 85 percent after deducing the seed yeast. The yeast was obtained in the usual compressed form.

Yeast obtained by this process, as is sometimes the case with commercial bakers' yeast, will at times contain a little mold. The mold content is only a very slight percentage.

The raising force (baking qualities) in all sodium yeasts corresponded to that of good baking yeast, used for baking purposes. In regard to appearance, odor and all other external characteristics, the sodium yeast was equal in quality to the normal compressed yeast containing the usual amount of potassium in every way.

Having described my invention, what I claim as new and desire to secure by Letters Patent, is:—

1. The process of manufacturing yeast which comprises preparing a yeast nutrient solution, and propagating yeast therein with aeration; the yeast nutrient solution containing sugar material and inorganic salts adapted to supply all essential yeast nutrients with the exception of potassium, the potassium being replaced by an equivalent amount of sodium.

2. The process of manufacturing yeast which comprises preparing a dilute yeast nutrient solution, and propagating yeast therein with aeration; the nutrient solution containing sugar material and inorganic salts comprising ammonium compounds adapted to nourish yeast and sodium salts in lieu of potassium salts.

3. The process of manufacturing yeast which comprises preparing a yeast nutrient solution, and propagating yeast therein with aeration; the nutrient solution containing sugar material, ammonium salts adapted to nourish yeast, sodium sulphate and magnesium sulphate.

4. The process of manufacturing yeast which comprises preparing a yeast nutrient solution, and propagating yeast therein with aeration; the nutrient solution containing sugar material, ammonium salts adapted to nourish yeast, sodium sulphate, magnesium sulphate, and a neutralizer adapted to neutralize the mineral acids set free by the propagating yeast.

5. The process of manufacturing yeast which comprises preparing a yeast nutrient solution, and propagating yeast therein with aeration; the nutrient solution containing about 100 parts sugar material, about 4.5 parts ammonium sulphate, about 1.5 parts ammonium dihydrogen phosphate, about 6.8 parts sodium sulphate, about 0.5 parts magnesium sulphate, about 7.0 parts chalk and about 5000 parts water.

6. In the art of manufacturing compressed bakers' yeast from nutrient solutions containing only sugar material and inorganic yeast nutrient salts, the step which comprises substituting sodium compounds for potassium compounds by cultivation through many generations.

In testimony whereof I have affixed my signature.

FRIEDRICH HAYDUCK.

Certificate of Correction.

It is hereby certified that in Letters Patent No. 1,449,104, granted March 20, 1923, upon the application of Friedrich Hayduck, of Wilmersdorf, Germany, for an improvement in "Processes for the Manufacture of Compressed Yeast," an error appears in the printed specification requiring correction as follows: Page 1, line 103, for the word "for" read *or;* and that the said Letters Patent should be read with this correction therein that the same may conform to the record of the case in the Patent Office.

Signed and sealed this 29th day of May, A. D., 1923.

[SEAL.]

KARL FENNING,
*Acting Commissioner of Patents.*